(12) United States Patent
De Andrade et al.

(10) Patent No.: US 12,483,603 B2
(45) Date of Patent: Nov. 25, 2025

(54) (RE) ASSIGNING OF NODES ON SECURITY AND PRIORITY NETWORK

(71) Applicant: AT&T Intellectual Property I, L.P., Atlanta, GA (US)

(72) Inventors: Carlos Eduardo De Andrade, Gainesville, FL (US); Rakesh K. Sinha, Edison, NJ (US); Edward Sherman, Matawan, NJ (US); Christopher Boaz, Duncannon, PA (US); Slawomir Mikolaj Stawiarski, Carpentersville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 116 days.

(21) Appl. No.: 18/438,763

(22) Filed: Feb. 12, 2024

(65) Prior Publication Data

US 2025/0260725 A1    Aug. 14, 2025

(51) Int. Cl.
*H04L 29/06*  (2006.01)
*H04L 9/40*  (2022.01)
*H04W 12/37*  (2021.01)

(52) U.S. Cl.
CPC .......... *H04L 63/205* (2013.01); *H04W 12/37* (2021.01)

(58) Field of Classification Search
None
See application file for complete search history.

(56) References Cited

U.S. PATENT DOCUMENTS

| | | | |
|---|---|---|---|
| 11,797,408 B2 * | 10/2023 | Mishra | G06F 11/27 |
| 2018/0293156 A1 * | 10/2018 | Zeng | G06F 11/3672 |
| 2019/0230185 A1 * | 7/2019 | Dhanabalan | H04L 12/14 |
| 2023/0217298 A1 * | 7/2023 | Chae | H04L 47/2441 |
| | | | 370/328 |
| 2023/0308901 A1 * | 9/2023 | De Andrade | H04W 24/08 |
| 2024/0031899 A1 * | 1/2024 | Filin | H04W 36/30 |
| 2025/0225260 A1 * | 7/2025 | Hu | G06N 20/00 |

* cited by examiner

*Primary Examiner* — Jeffery L Williams
(74) *Attorney, Agent, or Firm* — Guntin & Gust, PLC; Dana B. LeMoine

(57) ABSTRACT

Aspects of the subject disclosure may include, for example, determining regression models that predict resource utilization at security gateways as a function of performance indicator values measured at radio access network (RAN) nodes. Optimization models are built using the regression models and constraints related to the security gateway resources. Solutions to the optimization models include assignments of RAN nodes to communicate with security gateways, where the assignments satisfy the constraints in the optimization models. Other embodiments are disclosed.

20 Claims, 14 Drawing Sheets

210D $\longrightarrow$ $f\left(\sum \text{RAN\_KPIs}_t\right) \approx \text{NIC Volume}_t$, for each period of time $t$.

220D $\longrightarrow$ $g_1\left(\sum \text{RAN\_KPIs}_t\right) \approx \text{Max. single CPU Load}_t$, for each period of time $t$.

230D $\longrightarrow$ $g_2\left(\sum \text{RAN\_KPIs}_t\right) \approx \text{Max. total CPU Load}_t$, for each period of time $t$.

240D $\longrightarrow$ $g_3\left(\sum \text{RAN\_KPIs}_t\right) \approx \text{Upper bound CPU Load}_t$, for each period of time $t$.

FIG. 2D

$$m_j^k \left( \sum_{i \in N} v_{it}^k x_{ij} \right) + c_j^k, \quad \forall j \in S, t \in T.$$

FIG. 2G

$$m_j^{k_1} \left( \sum_{i \in N} v_{it}^{k_1} x_{ij} \right) + m_j^{k_2} \left( \sum_{i \in N} v_{it}^{k_2} x_{ij} \right) + \ldots + m_j^{k_n} \left( \sum_{i \in N} v_{it}^{k_n} x_{ij} \right) + c_j^{k_1,\ldots,n}, \quad \forall j \in S, t \in T.$$

FIG. 2H

| ID | Metric | SlopeDownlink | SlopeUplink | Intercept | R² | MAE | MSE | MAPE |
|---|---|---|---|---|---|---|---|---|
| Server1 | MaxCpuLoad | 0.004498 | 0.048205 | 6.270262 | 0.968946 | 2.65 | 10.76 | 0.07 |
| Server2 | MaxCpuLoad | 0.003562 | 0.068087 | 3.873540 | 0.966963 | 2.91 | 13.51 | 0.08 |
| Server3 | MaxCpuLoad | 0.004659 | 0.055265 | 2.977162 | 0.958585 | 2.77 | 13.02 | 0.07 |
| Server4 | MaxCpuLoad | 0.007936 | 0.024391 | 3.016361 | 0.987919 | 1.03 | 1.71 | 0.14 |
| Server5 | MaxCpuLoad | 0.024987 | -0.099031 | 12.730921 | 0.042441 | 9.04 | 122.65 | 0.24 |
| Datacenter A | MaxCpuLoad | 0.004180 | 0.052343 | 5.878310 | 0.880808 | 2.93 | 13.46 | 0.08 |

200I

FIG. 2I $$\overbrace{m_j^{v/d}\left(\sum_{i\in N}v_{it}^d x_{ij}\right)+c_j^{v/d}}^{\text{Downlink regression}}+\overbrace{m_j^{v/u}\left(\sum_{i\in N}v_{it}^u x_{ij}\right)+c_j^{v/u}}^{\text{Uplink regression}}\leq C^{nic}$$

- ↑ Regression Slope (first term $m$)
- ↑ Total downlink volume / Single input feature
- ↑ Regression Intercept

$$\overbrace{m_j^{c/d/sgl}\left(\sum_{i\in N}v_{it}^d x_{ij}\right)}^{\text{Downlink component}}+\overbrace{m_j^{c/u/sgl}\left(\sum_{i\in N}v_{it}^u x_{ij}\right)}^{\text{Uplink component}}+c_j^{c/sgl}\leq C^{cpu}$$

- ↑ Regression Slope 1
- ↑ Total downlink volume / Input feature #1
- ↑ Regression Slope 2
- ↑ Total uplink volume / Input feature #2
- ↑ Regression Intercept

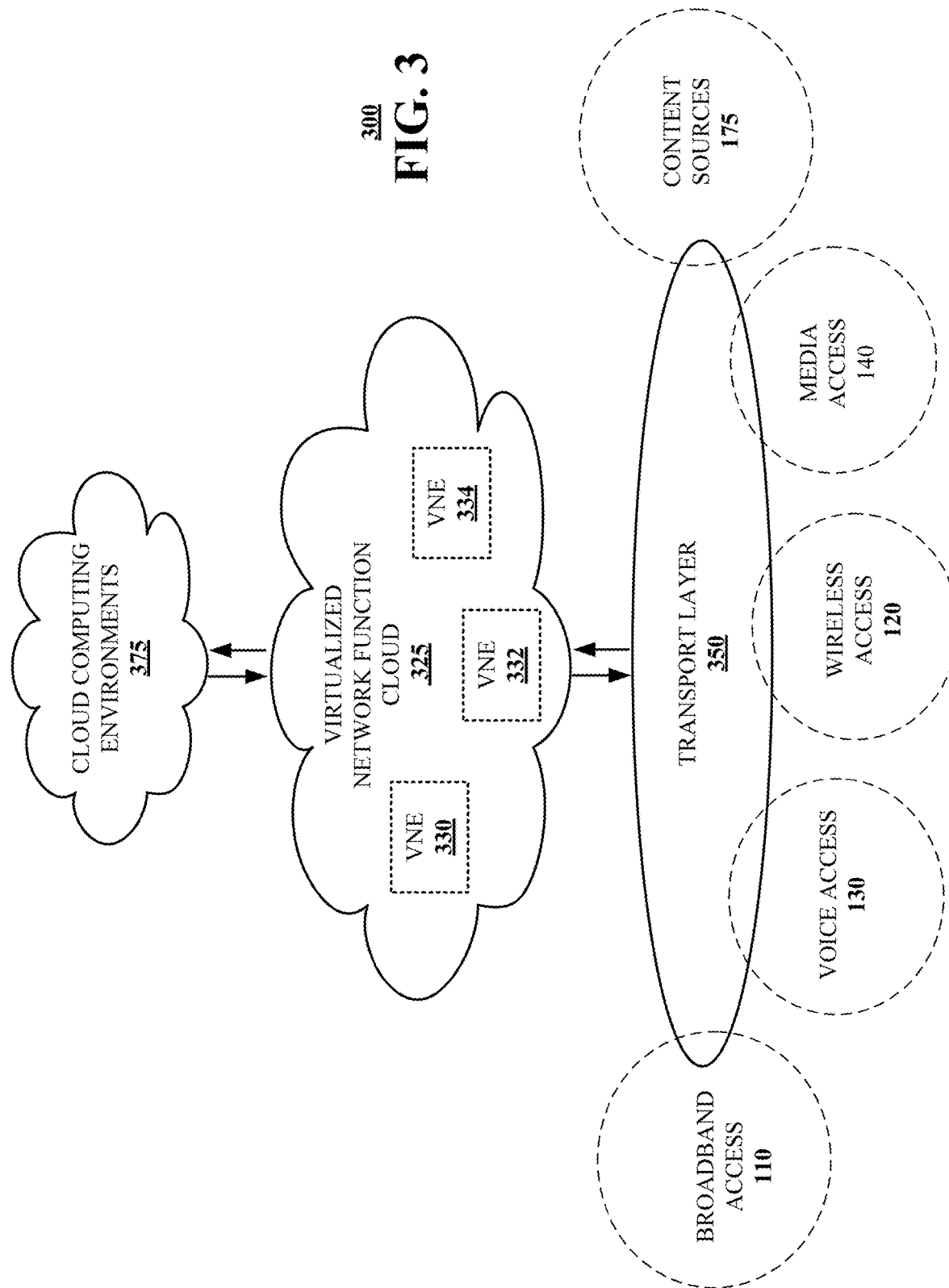

600

(RE) ASSIGNING OF NODES ON SECURITY AND PRIORITY NETWORK

FIELD OF THE DISCLOSURE

The subject disclosure relates to security gateways in communication networks.

BACKGROUND

Security gateways secure communication traffic to and from communication networks. A communication network may have one or more security gateways that each handle encrypted communication traffic from one or more radio access network (RAN) nodes such as eNodeBs and/or gNodeBs.

BRIEF DESCRIPTION OF THE DRAWINGS

Reference will now be made to the accompanying drawings, which are not necessarily drawn to scale, and wherein:

FIG. 2D shows example functions of RAN performance indicators that approximate security gateway utilization metrics in accordance with various aspects described herein.

FIG. 2G is a block diagram illustrating an example, non-limiting embodiment of a regression model for a single RAN performance indicator in accordance with various aspects described herein.

FIG. 2H is a block diagram illustrating an example, non-limiting embodiment of a regression model for multiple RAN performance indicators in accordance with various aspects described herein.

FIG. 2I is a block diagram illustrating an example, non-limiting embodiment of regression models for multiple security gateways in a datacenter in accordance with various aspects described herein.

FIG. 2J is a block diagram illustrating an example, non-limiting embodiment of an optimization model with a constraint related to a network interface card (NIC) utilization metric in accordance with various aspects described herein.

FIG. 2K is a block diagram illustrating an example, non-limiting embodiment of an optimization model with a constraint related to a processor utilization metric in accordance with various aspects described herein.

FIG. 3 is a block diagram illustrating an example, non-limiting embodiment of a virtualized communication network in accordance with various aspects described herein.

DETAILED DESCRIPTION

Figure 1:
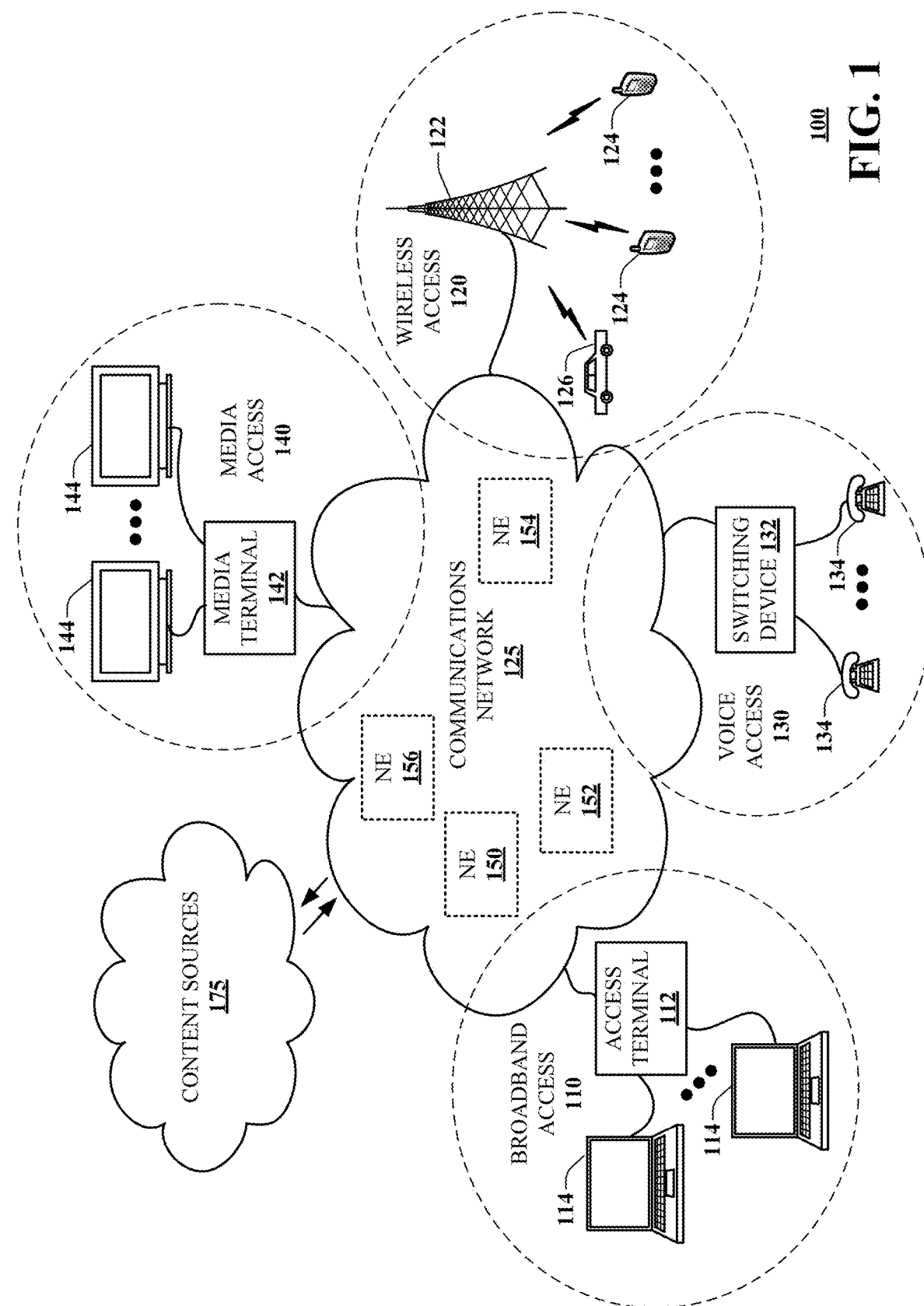
FIG. 1 is a block diagram illustrating an exemplary, non-limiting embodiment of a communications network in accordance with various aspects described herein.

The subject disclosure describes, among other things, illustrative embodiments for assigning RAN nodes to security gateways in a communication network. Other embodiments are described in the subject disclosure.

One or more aspects of the subject disclosure include a device, having a processing system including a processor; and a memory that stores executable instructions that, when executed by the processing system, facilitate performance of operations. The operations may include measuring at least one performance indicator value of a plurality of radio access network (RAN) nodes assigned to communicate with a plurality of security gateways; measuring a utilization metric value of the plurality of security gateways; performing a regression analysis based on the at least one performance indicator value of the plurality of RAN nodes and the utilization metric value to determine one or more regression models; evaluating the one or more regression models; and responsive to the evaluating, reassigning at least one of the plurality of RAN nodes to communicate with a second security gateway.

Additional aspects of the subject disclosure may include creating an optimization model from the one or more regression models; and evaluating the optimization model to determine assignments of each of the plurality of RAN nodes to various ones of the plurality of security gateways; the measuring the at least one performance indicator value includes measuring the at least one performance indicator value for both encrypted traffic and nonencrypted traffic at the plurality of RAN nodes; the encrypted traffic at the plurality of RAN nodes is routed through the plurality of security gateways; and the nonencrypted traffic at the plurality of RAN nodes is not routed through the plurality of security gateways.

Additional aspects may include the measuring the at least one performance indicator value including measuring the at least one performance indicator value over a plurality of time periods to determine a time series of performance indicator values; the measuring the utilization metric value of the plurality of security gateways including measuring the utilization metric value of the first security gateway over the plurality of time periods to determine a time series of utilization metric values; and the regression analysis being based on the time series of performance indicator values and the time series of the utilization metric values.

Additional aspects of the subject disclosure include the first security gateway being implemented on a virtual machine (VM) running on a physical server; and the measuring the utilization metric value of the first security gateway including measuring values related to the physical server.

Additional aspects of the subject disclosure include the measuring the at least one performance indicator value including measuring total data throughput, volume, accessibility (e.g., RAT ratio), mobility (e.g., handover ratio), retainability (e.g., data retainability ratio) download volume, upload volume, and/or traffic (e.g., download PDCP bytes) at the plurality of RAN nodes.

Additional aspects of the subject disclosure include the measuring the utilization metric value including measuring maximum single processor utilization, maximum total processor utilization, upper bound processor utilization, memory utilization, network interface card (NIC) utilization, graphics processing unit (GPU) utilization, or any other measurement of any resource at any of the plurality of security gateways.

One or more aspects of the subject disclosure include a non-transitory machine-readable medium, comprising executable instructions that, when executed by a processing system including a processor, facilitate performance of operations. The operations may include measuring, over a plurality of time periods, at least one performance indicator value of a plurality of radio access network (RAN) nodes assigned to communicate with at least one security gateway to determine a time series of performance indicator values; measuring, over the plurality of time periods, a utilization metric value of the at least one security gateway to determine a time series of utilization metric values; performing a regression analysis based on the time series of performance indicator values and the time series of utilization metric values to determine one or more regression models; creating an optimization model using the one or more regression models, wherein at least one output of the one or more regression models becomes a feature in the optimization model; and evaluating the optimization model to create new assignments of the plurality of RAN nodes to communicate with the at least one security gateway.

Additional aspects of the subject disclosure include the optimization model being configured to create new assignments that satisfy constraints related to the time series of utilization metric values. The constraints related to the time series of utilization metric values may include processor utilization metric, such as single processor maximum utilization, total processor maximum utilization (e.g., for multicore processors), upper bound processor utilization, memory utilization, network interface card (NIC) utilization, or any other measurement of any resource at the at least one security gateway.

Additional aspects of the subject disclosure include the at least one security gateway being implemented on a physical server, and the constraints related to the time series of utilization metric values comprise at least one metric related to the physical server.

Additional aspects of the subject disclosure include the measuring the at least one performance indicator value including measuring the at least one performance indicator value for both encrypted traffic and nonencrypted traffic at the plurality of RAN nodes, and the time series of utilization metric values being related to the encrypted traffic at the at least one security gateway.

One or more aspects of the subject disclosure include a method, comprising measuring, by a processing system including a processor, a plurality of performance indicator values of a radio access network (RAN) node assigned to communicate with a security gateway; measuring, by the processing system, a plurality of utilization metric values of the security gateway; performing, by the processing system, regression analyses based on the plurality of performance indicator values and the plurality of utilization metric values to determine a plurality of regression models; creating, by the processing system, an optimization model using the plurality of regression models; and evaluating, by the processing system, the optimization model to determine if the RAN node should remain assigned to communicate with the security gateway.

Additional aspects of the subject disclosure include the measuring the plurality of performance indicator values includes measuring the plurality of performance indicator values over a plurality of time periods; the measuring the plurality of utilization metric values includes measuring the plurality of utilization metric values over the plurality of time periods; and the optimization model being configured to determine RAN node to security gateway assignments that satisfy a plurality of constraints related to the plurality of utilization metric values.

Referring now to FIG. 1, a block diagram is shown illustrating an example, non-limiting embodiment of a system 100 in accordance with various aspects described herein. For example, system 100 can facilitate in whole or in part the (re)assignment of RAN nodes to security gateways. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 may be a node within a radio access network (RAN). For example, the base station or access point can include a 4G, 5G, or higher generation base station, such as an eNodeB, a gNodeB, an ng-eNodeB, or any other node capable of providing connectivity between mobile devices 124 and communications network 125. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In various embodiments, communications network 125 may provide secure communications (e.g., FirstNet) to high priority customers (e.g., first responders, governments, law enforcement, etc.), where the secure communications aim to provide a reliable communication channel even during adversities such as natural disasters and human-triggered disruption events such as accidents, riots, and war. In various embodiments, communications network 125 may simultaneously provide secure communications services to high priority customers, and nonsecure communications services to lower priority customers. Further, in various embodiments, if the network should become (partially) unavailable for lower priority customers, it should remain functional for the high priority customers that utilize secure communications, such as first responders and law enforcement as well as critical utility companies such as electric and gas providers.

In various embodiments, one or more of network elements 150, 152, 154, 156, etc., may include one or more security gateways. In these embodiments, RAN nodes (e.g., node 122 and others) may be assigned to communicate with a security gateway. For example, network element 154 may include a security gateway to which node 122 is assigned. In these embodiments, encrypted communications may be provided between the security gateway at NE 154 and a high priority customer such as mobile device 126 (e.g., law enforcement). For example, encrypted communications may be originated by a high priority customer at mobile device 126 while communicating with node 122. Node 122 then routes the encrypted communications to the security gateway implemented at NE 154. The security gateway at NE 154 may then decrypt and forward the incoming communications appropriately within (or outside) communications network 125. Also for example, secure communications originating from within communications network 125 may pass through the security gateway at NE 154 to be encrypted and then the encrypted traffic is sent to node 122 to be forwarded to the high priority customer at mobile device 126.

Various embodiments include multiple security gateways. For example, multiple network elements may implement security gateways. Also for example, in some embodiments, security gateways may be implemented on different pieces of physical hardware, and in other embodiments, multiple security gateways may be implemented on a single piece of physical hardware, such as in the case of multiple security gateways being instantiated on virtual machines on a single physical server. In various embodiments, RAN nodes such as node 122 are assigned to communicate with one or more security gateways implemented in communications network 125. As described further below, the assignment or reassignment of RAN nodes to security gateways may be performed by measuring performance indicator values at the RAN nodes, measuring utilization metric values at the security gateway (or the virtual machine in which the security gateway is instantiated, or the physical server upon which the security gateway is instantiated or running, etc.), and performing a regression analysis between the measured values at the RAN node and the measured values at the security gateway. In various embodiments, optimization models may be created that take into account constraints related to the utilization metric values at the security gateway, and through analysis of the optimization models, assignments or reassignments of the various RAN nodes to the various security gateways may be determined in a fashion that satisfies one or more of the constraints. These and other embodiments are described further below.

Figure 2A:
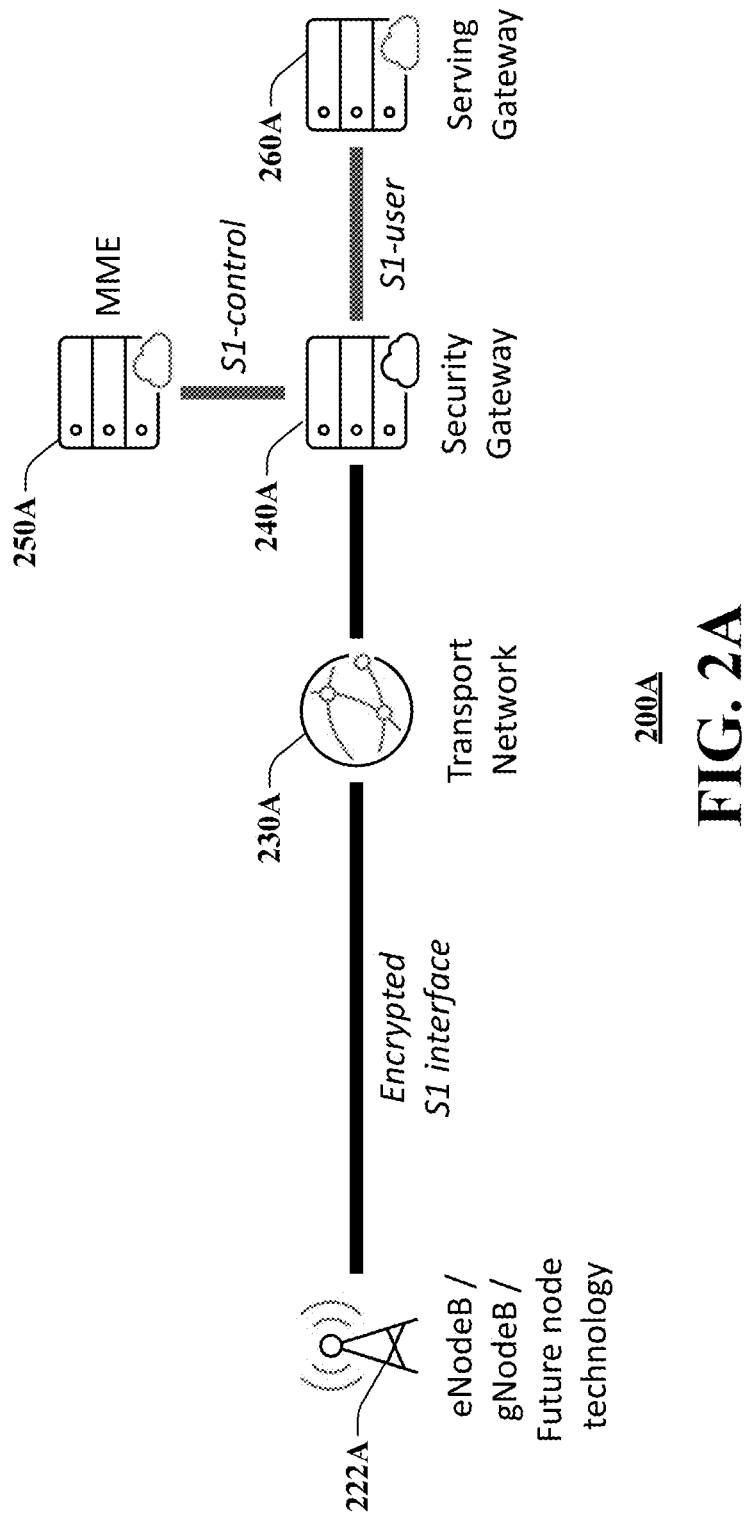
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. System 200A includes RAN node 222A, transport network 230A, security gateway 240A, mobility management entity (MME) 250A, and serving gateway 260A. RAN node 222A may be any node in a radio access network capable of communicating with user equipment (UE) and a communications system. For example, RAN node 222A may be node 122 (FIG. 1), an eNodeB, a gNodeB, or any other type of communication node capable of functioning as described herein.

Security gateway 240A, serving gateway 260A, and MME 250A may be implemented as network elements or within network elements in a communication network, such as communication network 125 (FIG. 1). Transport network 230A may be any communications infrastructure that provides network communication ability between node 222A and security gateway 240A.

As shown in FIG. 2A, S1 interface communication is encrypted end-to-end between RAN node 222A and security gateway 240A. For example, all of the traffic, including voice/video calls, text messages (SMS and extensions), and other data, that are encrypted by security gateway 240A are secure through the transport network 230A. In embodiments represented by FIG. 2A, the security gateway 240A is responsible for encrypting the traffic received from the serving gateway 260A and MME 250A, and decrypting the traffic received from node 222A. In various embodiments, not all S1 traffic is encrypted. For example, encrypted traffic may be used for some customers (e.g., FirstNet), while nonencrypted traffic may be used for other customers. In these embodiments, nonencrypted traffic coming from node 222A is sent directly to MME 250A and/or serving gateway 260, while the encrypted traffic coming from node 222A is sent to security gateway 240A.

FIG. 2A shows one RAN node and one security gateway. In some embodiments, system 200A includes multiple RAN nodes 222A and multiple security gateways 240A. The multiple RAN nodes 222A may be geographically dispersed, and may carry different amounts or types of traffic. For example, one RAN node may be in a densely populated urban area, and may carry significant amounts of both encrypted and nonencrypted traffic. Also for example, another RAN node may be in a suburban area and may carry significantly more non encrypted traffic than encrypted traffic. Accordingly, different RAN nodes may load a security gateway by varying amounts based on many factors, including location, time of day, time of year, etc. In some embodiments, security gateways are also geographically dispersed. For example, one security gateway may be located in a densely populated area, and another security gateway may be located in a less densely populated area. Further, in some embodiments, multiple security gateways may be co-located.

In some embodiments, security gateways are implemented as virtual appliances (virtual network functions) on commodity hardware that may reside on cloud services. Unlike special-purpose hardware, security gateways implemented as virtual appliances rely heavily on the CPU for handling the control packages and encrypted user traffic. CPU bandwidth available to a security gateway may be limited, depending on the load handled by the server and the number of CPU cycles provided by the cloud operator and subjacent contracts. In addition, security gateways may also have other limited resources, such as network interface card (NIC) cards (or any other network interface) and main memory capacity. Various embodiments described herein assign RAN nodes to communicate with security servers in a manner that results in a load balance that does not violate resources' capacity. As used herein, the terms "assigning nodes" and "homing nodes" are used synonymously, and the terms "reassigning nodes" and "rehoming nodes" are also used synonymously.

FIG. 2A shows an MME 250A as a control plane network element, and serving gateway 260A as a user plane network element, however the various embodiments described herein are not so limited. For example, control plane network elements may include access management functions (AMF) and session management functions (SMF), and user plane network elements may include any type of user plane function (UPF). Any number and/or type of control plane functions and user plane functions may be coupled to communicate with any number of security gateways.

Figure 2B:
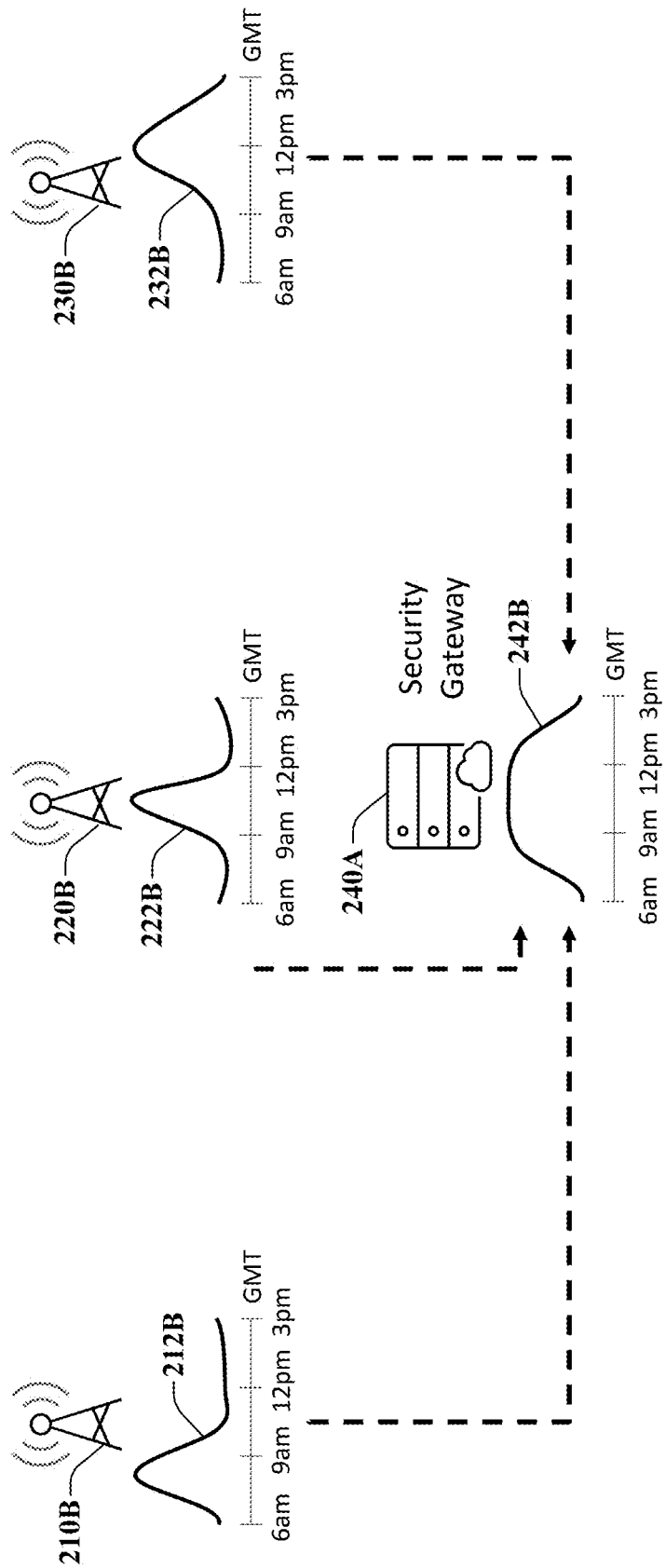
FIG. 2B is a block diagram illustrating an example, non-limiting embodiment of RAN node assignments to communicate with a security gateway in accordance with various aspects described herein.

FIG. 2B is a block diagram illustrating an example, non-limiting embodiment of RAN node assignments to communicate with a security gateway in accordance with various aspects described herein. As illustrated in FIG. 2B, multiple RAN nodes may be assigned to communicate with a single security gateway. For example, RAN nodes 210B, 220B, and 230B may all be assigned to communicate with security gateway 240A. In the example of FIG. 2B, RAN node 210B utilizes resources of security gateway 240A according to graph 212B, RAN node 220B utilizes resources of security gateway 240A according to graph 222B, and RAN node 230B utilizes resources of security gateway 240A according to graph 232B. The utilization resource graphs 212B, 222B, and 232B may represent the utilization of any type or combination of resources associated with security gateway 240A. For example, utilization resource graphs 212B, 222B, and 232B may represent the utilization of CPU resources, memory resources, network interface resources, GPU resources, custom hardware resources, or any other resource associated with security gateway 240A, or associated with the performance of security gateway 240A.

In some embodiments, assignments or reassignments of RAN nodes to security gateways are made in a manner that satisfies constraints related to resource utilization at the security gateways. For example, as shown in FIG. 2B, RAN node 210B has a peak resource utilization between about 6:00 AM and 11:00 AM GMT, RAN node 220B has a peak resource utilization between about 9:00 AM and 12:00 PM GMT, and RAN node 230B has a peak resource utilization between about 11:00 AM and 2:00 PM GMT. When all three RAN nodes shown in FIG. 2B are assigned to communicate with security gateway 240A, the resource utilization shown at 242B results. Various embodiments determine security gateway resource utilization for a number of RAN nodes over time, and then performs assignments or reassignments of RAN nodes to security gateways in a manner that satisfies the constraints.

In some embodiments, the resources utilized at the security gateway correspond to a piece of special purpose hardware. For example, security gateway 240A may be implemented as a standalone server, and the resources utilized at security gateway 240A may correspond to resources of the physical server that is the security gateway. Also for example, security gateway 240A may be implemented within a virtual machine, and the resources utilized at the security gateway may correspond to resources of the virtual machine. In still further examples, security gateway 240A may be implemented within a virtual machine that is further implemented on a physical server, and the resources utilized at the security gateway may correspond to resources of the physical server upon which the virtual machine is implemented.

Figure 2C:
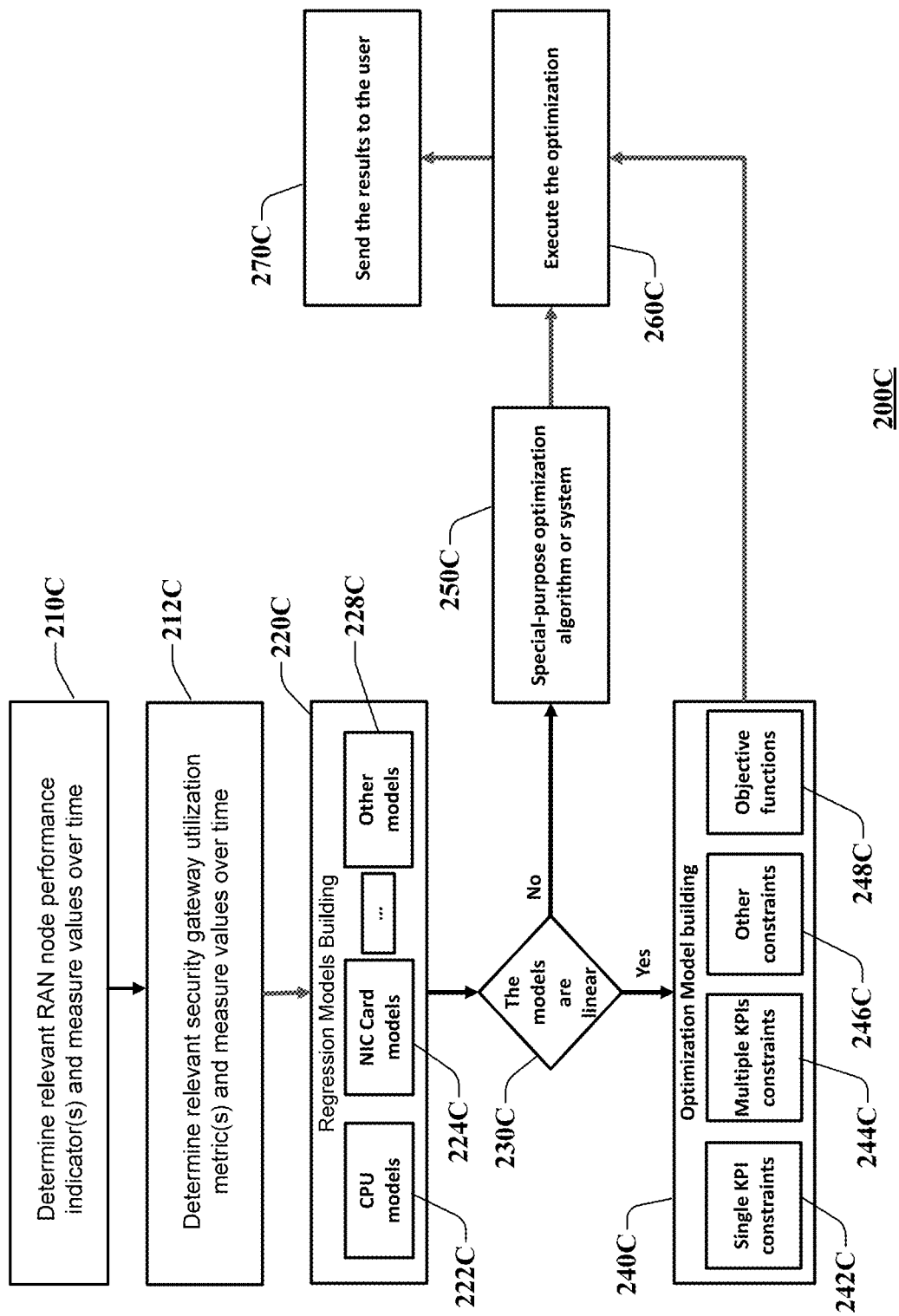
FIG. 2C depicts an illustrative embodiment of a method in accordance with various aspects described herein.

FIG. 2C depicts an illustrative embodiment of a method in accordance with various aspects described herein. Method 200C represents an overview of various embodiments for assigning or reassigning RAN nodes to communicate with various security gateways. At 210C, relevant RAN node performance indicators are identified and then the corresponding performance indicator values are measured over time. Any number or type of performance indicators may be identified as relevant. For example, in some embodiments, various quality of service class identifier (QCI) key performance indicators (KPIs) are determined as relevant. Also for example, a combination of high priority and low priority QCI KPIs (e.g., volume and throughput) may be identified as relevant. In still further examples, other performance indicators such as accessibility performance indicators (e.g., RAT ratio), mobility performance indicators (e.g., handover ratio), retainability performance indicators (e.g., data retainability ratio), throughput performance indicators (e.g., download volume), and/or traffic performance indicators (e.g., download PDCP bytes) are identified as relevant. As used herein, the term "key performance indicator" refers to any suitable performance indicator. The use of the word "key" preceding "performance indicator" is not meant to restrict the determination or measurement of any performance indicator in any way. For example, any performance indicator determined to be relevant may be referred to as a "performance indicator" or a "key performance indicator."

Once relevant RAN node performance indicators are identified at 210C, measurements of performance indicator values are taken over time. For example, throughput and volume at each RAN node may be measured over any given time period (e.g., weeks, months, etc.). Measurements may also be taken over special periods (e.g., weekends, evenings, holidays, sporting event times, political event schedules, etc.) In some embodiments, measurements are taken at discrete time intervals, such as every minute or every fifteen minutes. Also in some embodiments, measurements are averaged over time intervals. For example, in some embodiments, measurements taken every minute may be averaged over a fifteen minute period to arrive at one average value every fifteen minutes. Also in some embodiments, peak measurements may be identified over discrete time intervals. For example, in some embodiments, a peak measurement may be identified for every fifteen minute period from a group of measurements taken every minute within the fifteen minute period.

At 212C, relevant security gateway utilization metrics are identified and then the corresponding metric values are measured over time. Any number or type of security gateway utilization metrics may be identified as relevant. For example, in some embodiments, various processor utilization metrics may be determined as relevant. Also for example, network interface metrics may be identified as relevant. In still further examples, a number of tunnels may be identified as relevant.

Once relevant security gateway utilization metrics are identified at 212C, measurements of security gateway utilization metrics values are taken over time. For example, network interface throughput and volume at security gateways may be measured over any given time period (e.g., weeks, months, etc.). Measurements may also be taken over special periods (e.g., weekends, evenings, holidays, sporting event times, political event schedules, etc.) In some embodiments, measurements are taken at discrete time intervals, such as every minute or every fifteen minutes. Also in some embodiments, measurements are averaged over time intervals. For example, in some embodiments, measurements taken every minute may be averaged over a fifteen minute period to arrive at one average value every fifteen minutes. Also in some embodiments, peak measurements may be identified over discrete time intervals. For example, in some embodiments, a peak measurement may be identified for every fifteen minute period from a group of measurements taken every minute within the fifteen minute period.

At 220C, regression models are built using the measured RAN node performance indicator values and the measured security gateway utilization metric values. For example, one or more CPU regression models 222C may be built using measured RAN node performance indicator values and measured security gateway CPU utilization values. Also for example, one or more network interface card (NIC) regression models 224C may be built using measured RAN node performance indicator values and measured security gateway network interface utilization values. Any number of other regression models 228C may be built using measured RAN node performance indicator values and other measured security gateway utilization metric values.

The regression models built at 220C describe historical relationships between RAN node performance indicator values and security gateway utilization metric values, and may be used to predict future relationships between the same RAN node performance indicator values and security gateway utilization metric values. For example, one of CPU models 222C may describe a historical relationship between throughput at a particular RAN node and maximum single processor load at a security gateway to which the RAN node is assigned, and the same CPU model may be used to predict future maximum single processor load at any security gateway to which the RAN node gets assigned based on predicted future throughput at the same RAN node. In some embodiments, the RAN node performance indicator values may correspond to both encrypted and nonencrypted traffic at the RAN node (e.g., throughput for all traffic and the RAN node), and the security gateway utilization metric values may correspond to only encrypted traffic (e.g., processor utilization used for encryption/decryption). Even though the performance indicator values may correspond to all traffic and the utilization metric values may correspond to only encrypted traffic, in some embodiments, the regression models may successfully correlate security gateway utilization metric values to the RAN node performance indicator values in a manner that provides a tool for prediction of future security gateway resource utilization based on RAN node assignments.

The regression models built at 220C may be linear or nonlinear. If at 230C, the regression models are determined to be linear, then linear optimization models may be built at 240C, and if the regression models are determined to be nonlinear, then special purpose optimization algorithms or systems may be used at 250C.

At 220C, optimization models are built. In some embodiments, the optimization models are built using the linear regression models built at 220C, and include constraints related to the relevant security gateway utilization metrics. For example, an optimization model may include one or more regression models that predict future single processor load as a function of throughput at different RAN nodes, and the regression models may be equated to a constraint value related to the maximum allowable single processor load at a security gateway.

Optimization models may include single performance indicator constraints 242C, multiple performance indicator constraints 244C, other constraints 246C, and any other objective functions 248 that may be evaluated as part of the assignment of RAN nodes to security gateways. Example objective functions may include latency between RAN nodes and security gateways, geographical distance between RAN nodes and security gateways, and the like. These and other embodiments are described further below.

At 260C, the optimization is executed. In the case of executing linear optimization models built at 240C, various embodiments may use off-the-shelf solvers that can handle mixed integer programming models (including constraint programming solvers if all terms are integers. In the case of nonlinear models built at 250, various embodiments may use custom or special purpose algorithms or systems to execute the optimizations. At 270, the results are reported. In some embodiments, the results are automatically applied. In some embodiments, the results include assignments of RAN nodes to security gateways. Also in some embodiments, the results include reassignments of RAN nodes to security gateways. In still further embodiments, the results include increasing or decreasing the number of security gateways.

FIG. 2D shows example functions of RAN performance indicators that approximate security gateway utilization metrics in accordance with various aspects described herein. The functions shown in FIG. 2D represent, at a high level, example desired outcomes of the regression analysis performed at 220C (FIG. 2C). For example, function $f$ at 210D, which is built from historical RAN performance indicator values (represented as $\Sigma RAN\_KPIs_t$) and NIC volume utilization metric values (represented as $NIC\ VOLUME_t$), is useful to predict future NIC volume at a security gateway that has been assigned to communicate with a particular RAN node. In some embodiments, the regression analysis is performed for each period of time t. For example, regression models may be built for each period of time corresponding to the measurements of performance indicator values and utilization metric values. Also for example, regression models may be built for specific times or events (e.g., sporting events, holidays, or any other event that may create anomalous resource utilization). In some embodiments, function f takes a set of performance indicator values from the RAN nodes assigned to a security gateway, and predicts the volume/throughput on its NIC cards for each period of time. This predicted volume/throughput is used during the optimization to make sure that the RAN nodes assigned to that security gateway do not generate more traffic than the NIC card can handle, for each period of time.

Similarly, functions g1, g2, and g3, which are built from historical maximum single processor (CPU) load, maximum total processor load, and upper bound processor load, respectively, are useful to predict the utilization of these same resources at a security gateway that has been assigned to communicate with a particular RAN node. Example processor utilization metrics are described further below with reference to FIGS. 2E and 2F.

Figures 2E, 2F:
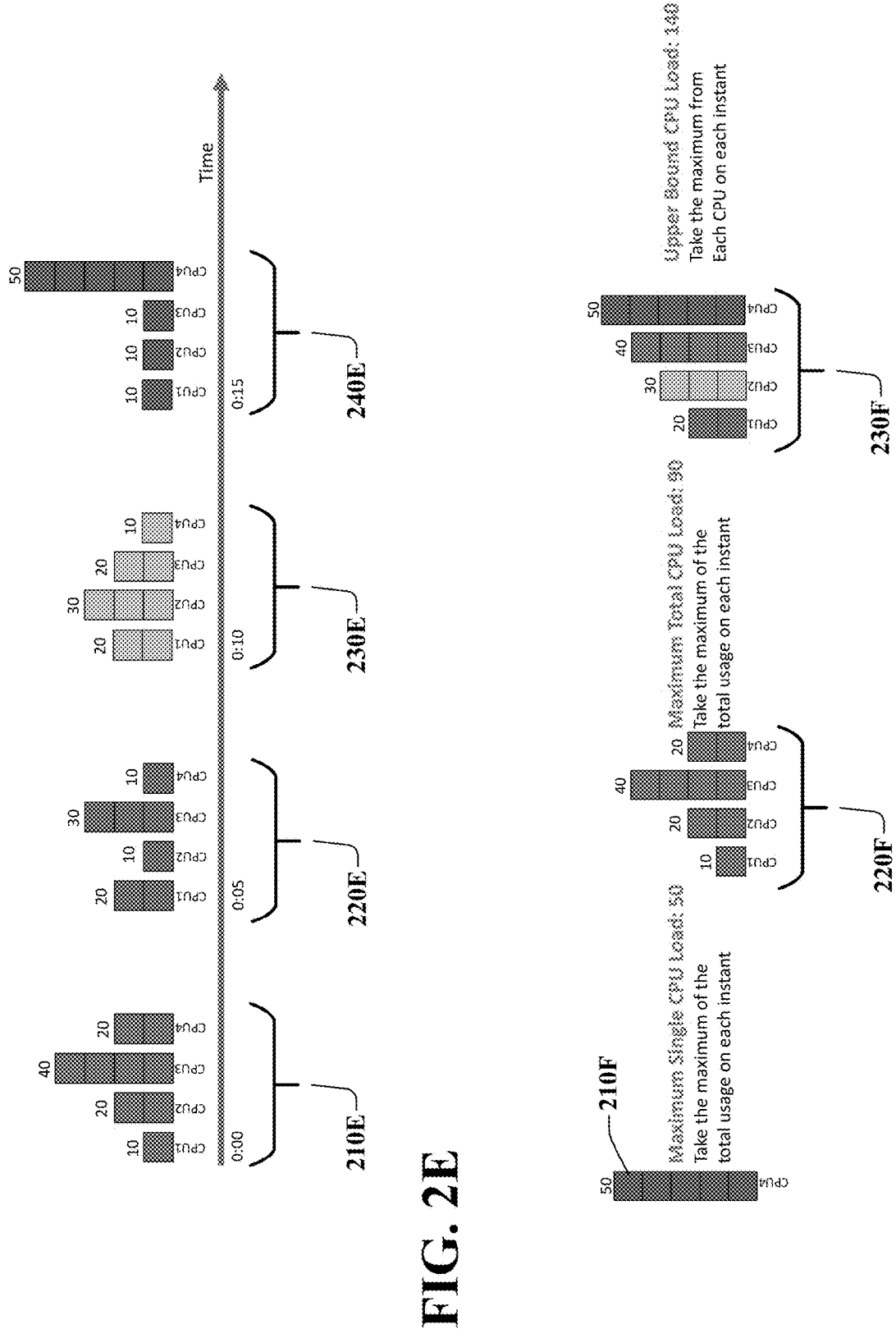
FIG. 2E is a block diagram illustrating an example, non-limiting embodiment of security gateway processor utilization over time in accordance with various aspects described herein.
FIG. 2F is a block diagram illustrating an example, non-limiting embodiment of security gateway processor utilization metrics over time in accordance with various aspects described herein.

FIG. 2E is a block diagram illustrating an example, non-limiting embodiment of security gateway processor utilization over time in accordance with various aspects described herein. FIG. 2E shows processor load measurements for four separate processors at four different discrete time periods. For example, processor loads for CPU1, CPU2, CPU3, and CPU4 are shown at time zero (210E), time equals 5 minutes (220E), time equals 10 minutes (230E), and time equals 15 minutes (240E). In some embodiments, the CPU load utilization metric measurements are made every minute, and the measurements shown in FIG. 2E represent the sum of measurements made during every five minute period.

FIG. 2F is a block diagram illustrating an example, non-limiting embodiment of security gateway processor utilization metrics over time in accordance with various aspects described herein. FIG. 2F shows three example processor utilization metrics: maximum single CPU load 210F, maximum total CPU load 220F, and upper bound CPU load 230F. In the example of FIG. 2F, the three processor utilization metrics values are determined for every fifteen minute period, although any period may be used. The maximum single CPU load 210F corresponds to the load measured at CPU 4 at time 240E, the maximum total CPU load 220F corresponds to the sum of CPU loads at time 210E, and the upper bound CPU load 230 corresponds to the sum of CPU1 load at time 220E, CPU2 load at time 230E, CPU3 load at time 210E, and CPU4 load at time 240E.

In some embodiments, the processor load values shown in FIGS. 2E and 2F may represent processor loads attributable to a virtual machine upon which a security gateway is instantiated. Also in some embodiments, the processor load values shown in FIGS. 2E and 2F may represent processor loads of a physical server upon which a security gateway is instantiated.

FIG. 2G is a block diagram illustrating an example, non-limiting embodiment of a regression model for a single RAN performance indicator in accordance with various aspects described herein. In some embodiments, the regression analysis is performed as a single linear regression with all RAN node performance indicators, resulting in several slopes and one intercept (e.g., CPU regressions). Also in some embodiments, a single model is produced for each RAN node performance indicator or subset of RAN node performance indicators (e.g., volume regressions). The form for a regression model for a single RAN node performance indicator is shown at 200G, where k is the input RAN node performance indicator, S is the set of security gateways, and T is the set of time periods for which the measurements and predictions are made.

First, we aggregate the performance indicator values $v_{it}^k$ of performance indicator k for all RAN nodes in a given time t. In the form shown at 200G, a simple sum is performed; however, any other linear/affine combination on x may be used. The aggregation depends on the decision variables $x_{ij} \in \{0, 1\}$ that defines if RAN node i is assigned to security gateway j. Accordingly, the term in parenthesis depends on the node assignment. Additionally, $m_j^k$ is the performance indicator k slope of the linear regression for security gateway j, and $c_j^k$ is the performance indicator k intercept of the linear regression for security gateway j.

FIG. 2H is a block diagram illustrating an example, non-limiting embodiment of a regression model for multiple RAN performance indicators in accordance with various aspects described herein. The form for a regression model for multiple RAN node performance indicators is shown at 200H, where k is the input RAN node performance indicator, S is the set of security gateways, and T is the set of time periods for which the measurements and predictions are made.

In the regression model shown at 200H, each performance indicator $k_1, \ldots, k_n$ has a slope $m_j^{k_1}, \ldots, m_j^{k_n}$ and there is a single intercept $c_j^{k_1, \ldots, k_n}$. The slopes are multiplied against the aggregated performance indicator values of $v_{it}^{k_1}, \ldots, v_{it}^{k_n}$ of performance indicators $k_1, \ldots, k_n$ for all RAN nodes in a given time t. In the form shown at 200H, a simple sum is performed; however, any other linear/affine combination on x may be used.

The aggregation depends on the decision variables $x_{ij} \in \{0, 1\}$ that defines if node i is assigned to security gateway j. Accordingly, the term in parenthesis depends on the node assignment. Note that in both single and multiple performance indicator cases, that the term in parenthesis is assumed to be linear on x. Accordingly, in some embodiments, the performance indicator values $v_{it}^k$ are cast to real numbers. Any kind of transformation can be applied, including standard ML transformations.

FIG. 2I is a block diagram illustrating an example, non-limiting embodiment of regression models for multiple security gateways in a datacenter in accordance with various aspects described herein. Table 2001 shows regression models for five security gateways in a tabular format. For example, servers one through five correspond to five different security gateways, and each linear regression model predicts maximum CPU load as a function of downlink volume and uplink volume. Each regression model has a slope for the uplink, a slope for the downlink, and a single intercept. The five security gateways shown in table 2001 are located in a single data center shown as data center A. In some embodiments, the regression models are generated for each security gateway in the data center using uplink and downlink data of each of the RAN nodes assigned to communicate to the security gateways.

In some embodiments, the quality of the linear regression models (e.g., the quality of the fit of the model to the data) is measured to determine whether a particular regression model will be used to predict future resource utilization at a security gateway. For example, table 2001 shows four example metrics that may be used to measure the quality of the linear regression models. These metrics include R-squared, mean absolute error (MAE), mean squared error (MSE), and mean absolute percentage error (MAPE), however the various embodiments described herein are not limited to the listed metrics. For example, other metrics or combinations of metrics may be used. In some embodiments, a metric describing the quality of a particular linear regression model may be compared to a threshold to determine whether that linear regression model is going to be used. For example, the R-squared value may be compared to a fixed threshold (e.g., 0.75) to determine whether a particular linear regression model is going to be used. In the example of FIG. 2I, security gateways one through three have an R-squared value greater than 0.75 and security gateways four and five have an R-squared value less than 0.75. In this example, the data from the higher quality linear regression models (security gateways one through three) may be used to produce a general regression model shown in the bottom row of table 2001 as a regression model for data center A. Also in some embodiments, the general regression model in the bottom row of table 2001 may be used as the linear regression model for the security gateways having a lower quality regression model. For example, the general regression model in the bottom row of table 2001 may be used as the linear regression model for security gateways four and five.

FIG. 2J is a block diagram illustrating an example, non-limiting embodiment of an optimization model with a constraint related to a network interface card (NIC) utilization metric in accordance with various aspects described herein. Optimization model 200J is built using a downlink regression model that predicts network interface load at a security gateway as a function of downlink volume of RAN nodes assigned to communicate with the security gateway, and also using an uplink regression model that predicts network interface load at the same security gateway as a function of uplink volume of the same RAN nodes assigned to communicate with the security gateway. The total network interface load predicted at the security gateway is compared to a capacity constraint shown as $C^{nic}$ in FIG. 2J.

The result of solving optimization model 200J is a set of decision variables $x_{ij} \in \{0, 1\}$ that specify whether RAN node i is assigned to communicate with security gateway j. Within optimization model 200J, $m_j^{v/d}$ is the downlink regression model slope for security gateway j, $m_j^{v/u}$ is the uplink regression model slope for security gateway j, $c_j^{v/d}$ is the downlink regression model intercept for security gateway j, $c_j^{v/u}$ is the uplink regression model intercept for security gateway j, $v_{it}^d$ is the downlink volume of RAN node i at time interval t, and vu is the uplink volume of RAN node i at time interval t.

FIG. 2K is a block diagram illustrating an example, non-limiting embodiment of an optimization model with a constraint related to a processor utilization metric in accordance with various aspects described herein. Optimization model 200K is built using a downlink regression model that predicts CPU load for a single processor at a security gateway as a function of downlink volume of RAN nodes assigned to communicate with the security gateway, and also using an uplink regression model that predicts CPU load for a single processor at the same security gateway as a function of uplink volume of the same RAN nodes assigned to communicate with the security gateway. The total predicted CPU load for the single processor at the security gateway is compared to a capacity constraint shown as $C^{cpu}$ in FIG. 2K.

The result of solving optimization model 200K is a set of decision variables $x_{ij} \in \{0, 1\}$ that specify whether RAN node i is assigned to communicate with security gateway j. Within optimization model 200K, $m_j^{c/d/sgl}$ is the downlink regression model slope for security gateway j, $m_j^{c/u/sgl}$ is the uplink regression model slope for security gateway j, $c_j^{c/sgl}$ is the combined regression model intercept for security gateway j, $v_{it}^d$ is the downlink volume of RAN node i at time interval t, and $v_{it}^u$ is the uplink volume of RAN node i at time interval t.

Once the optimization model shown in FIGS. 2J and 2K are solved, various actions may take place. For example, the optimization may report a feasible or optimal solution that includes a valid assignment of RAN nodes to security gateways. In some embodiments, the assignments may be performed automatically as a result of the optimization models being solved, and in other embodiments, a report may be provided to a system or a user of a system for further analysis. In some embodiments the optimization may report that the problem is infeasible (e.g., there is no valid solution). In these embodiments, a system or user may make changes in the input (e.g., number of RAN nodes, security gateways, regression models, and/or other configurations) and then rerun the optimization. Also in some embodiments, the optimization may report that a feasible solution is unknown, and that the solver cannot find a valid solution nor prove that no valid solutions exist. In these embodiments, a system or user may provide more time or more computational resources to the solver to explore a larger portion of the search space.

Figure 2L:
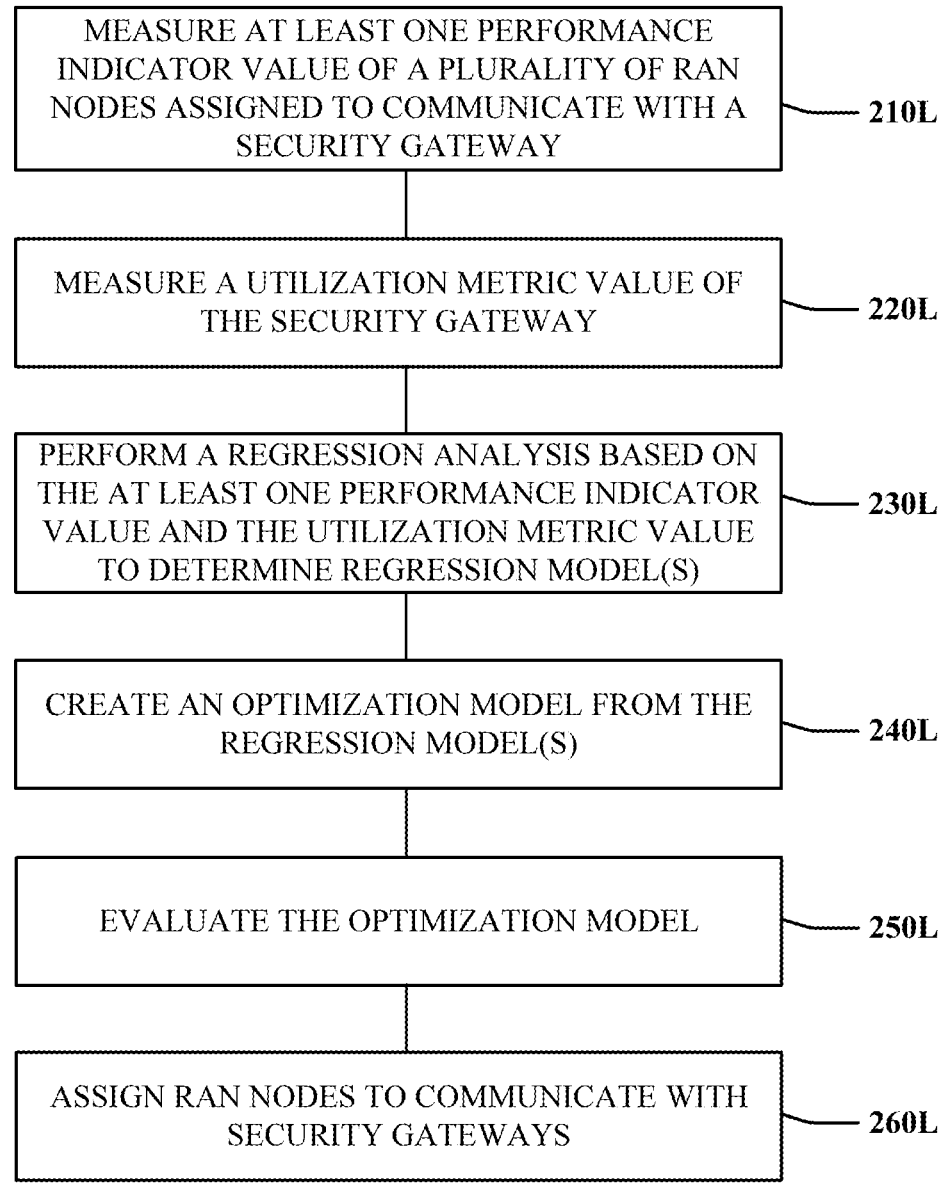
FIG. 2L depicts an illustrative embodiment of a method in accordance with various aspects described herein.

FIG. 2L depicts an illustrative embodiment of a method in accordance with various aspects described herein. At 210L of method 200L, at least one performance indicator value of a plurality of RAN nodes assigned to communicate with a security gateway are measured. The at least one performance indicator value may correspond to any type of performance indicator that is measurable at a RAN node. Examples include volume and throughput performance indicators. Accessibility performance indicators (e.g., RAT ratio), mobility performance indicators (e.g., handover ratio), retainability performance indicators (e.g., data retainability ratio), throughput performance indicators (e.g., download volume), and/or traffic performance indicators (e.g., download PDCP bytes). In some embodiments, the performance indicator values are measured over various periods of time, such as weeks or months.

At 220L, a utilization metric value of the security gateway is measured. Example utilization metrics include network interface load, maximum processor load for a single processor, maximum processor load for more than one processor, and the number of tunnels in use at the security gateway. In some of embodiments, the utilization metric values are measured over various periods of time. For example, the utilization metric values may be measured over the same periods of time that the performance indicator values are measured.

At 230L, a regression analysis is performed based on the at least one performance indicator value and the utilization metric value to determine one or more regression models. As described above, the regression models may be linear models that correlate the utilization metric values with the performance indicator values. In some embodiments, multiple regression models are created that are useful to predict resource utilization at the security gateway as a function of one or more performance indicator values over time.

At 240L, one or more optimization models are created from the regression models. Example optimization models are described above with reference to FIGS. 2J and 2K. The optimization models may predict resource utilization at security gateways as a function of performance indicator values, and also as a function of which RAN nodes are assigned to which security gateway. At 250L, the optimization models are evaluated. The output of the evaluation is a set of decision variables $x_{ij} \in \{0, 1\}$ that specify whether RAN node i is assigned to communicate with security gateway j. At 260L, RAN nodes are assigned to communicate with security gateways according to the decision variables output from the evaluation of the optimization model.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of systems, subsystems, functions, and/or methods described herein. For example, virtualized communication network 300 can facilitate in whole or in part the (re)assignment of RAN nodes to security gateways.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
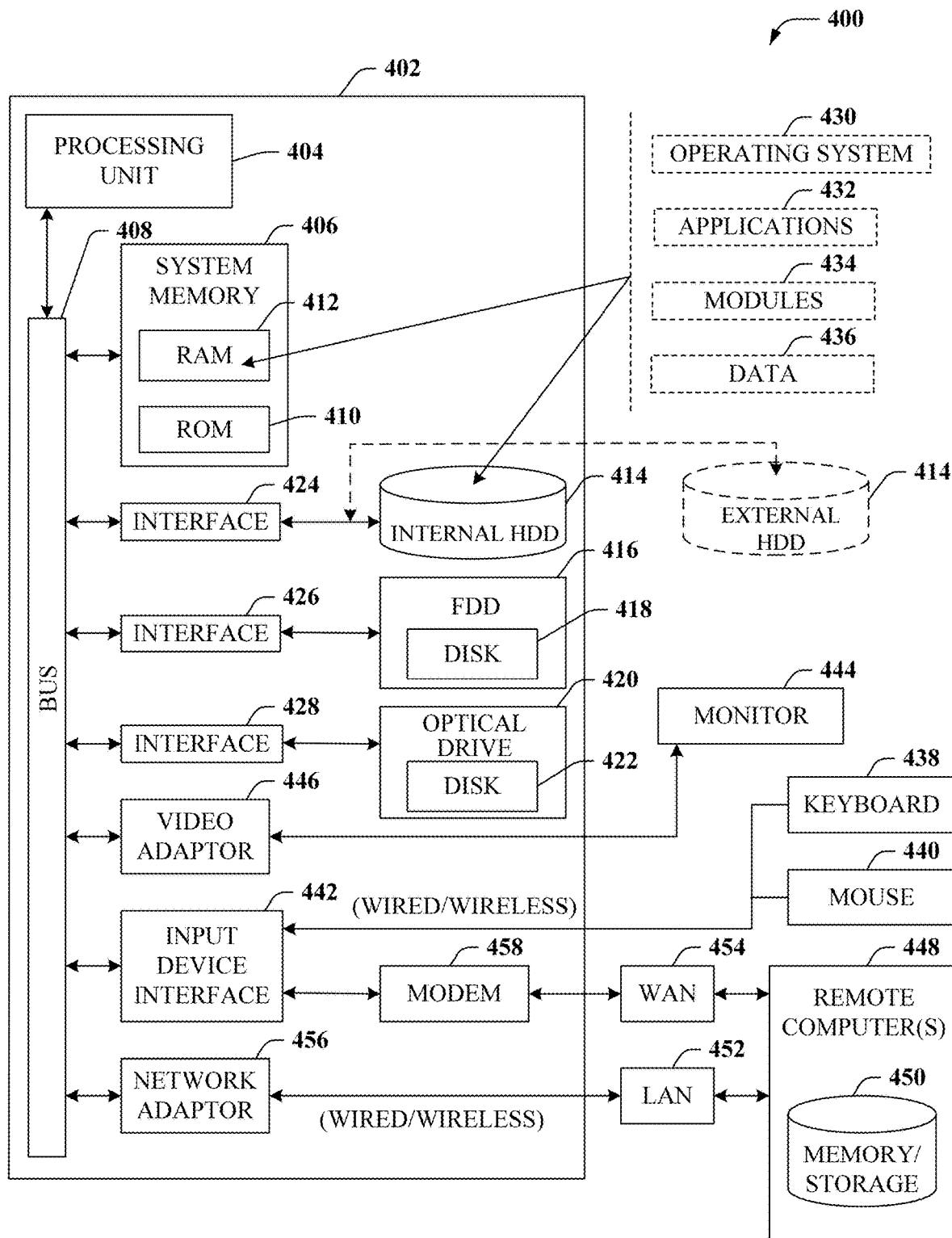
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part the (re)assignment of RAN nodes to security gateways.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
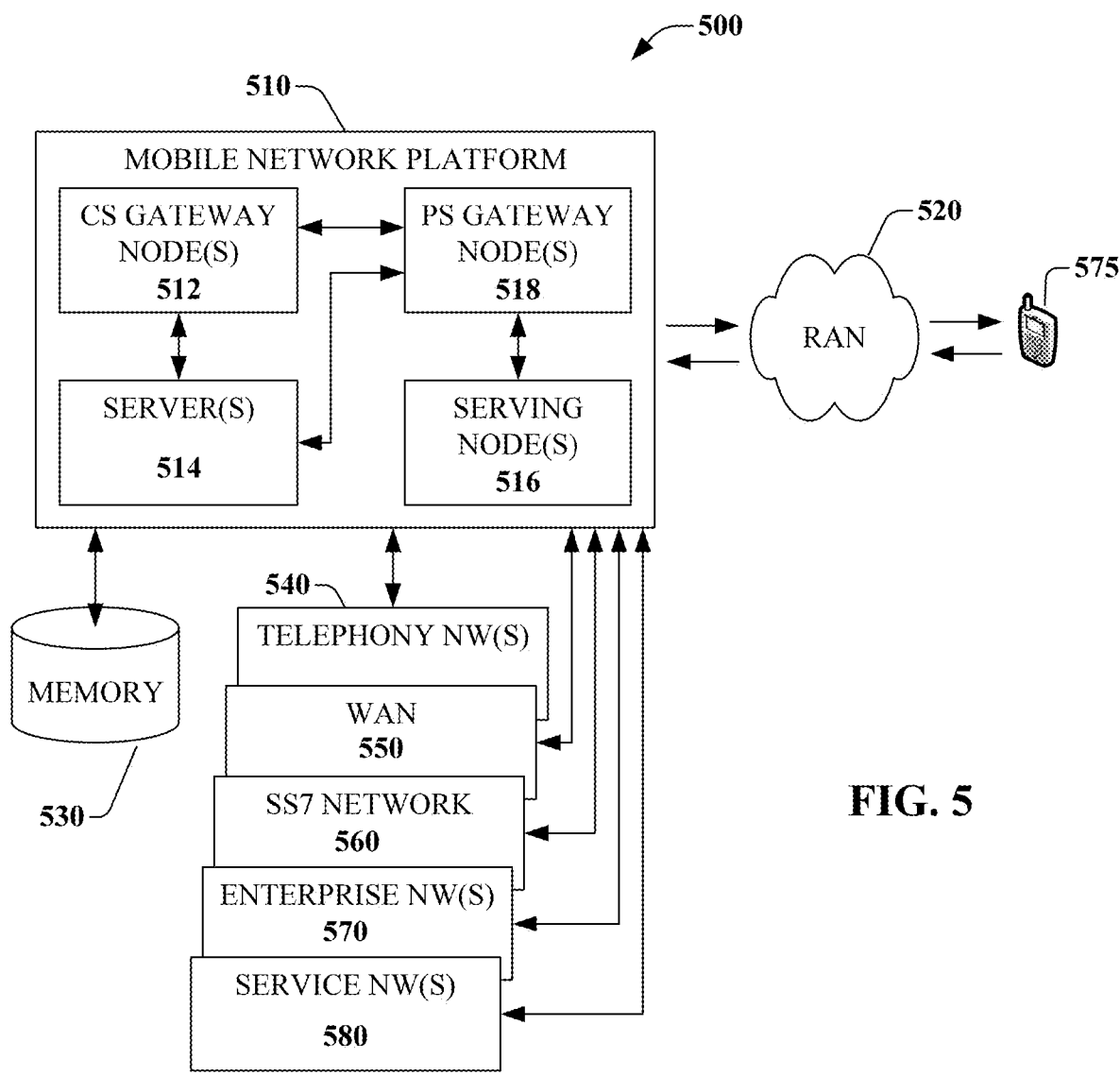
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part the (re)assignment of RAN nodes to security gateways. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
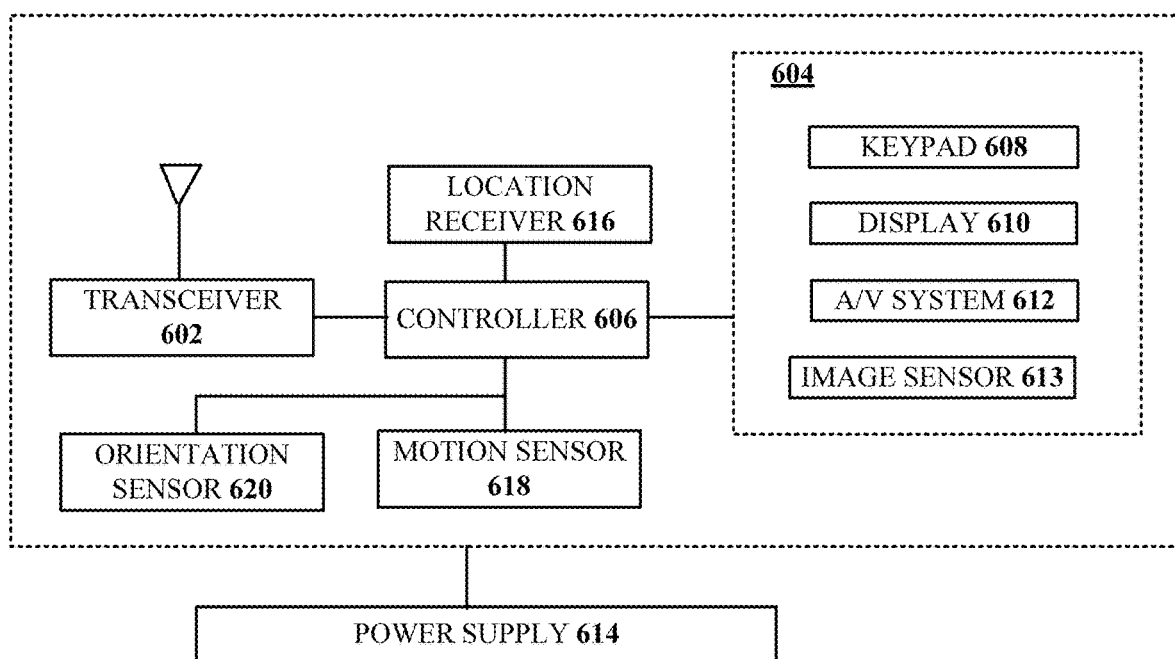
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the (re)assignment of RAN nodes to security gateways.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
measuring at least one performance indicator value of a plurality of radio access network (RAN) nodes assigned to communicate with a plurality of security gateways;
measuring a utilization metric value of the plurality of security gateways;
performing a regression analysis based on the at least one performance indicator value of the plurality of RAN nodes and the utilization metric value to determine one or more regression models;
evaluating the one or more regression models; and responsive to the evaluating, reassigning at least one of the plurality of RAN nodes to communicate with a different one of the plurality of security gateways.

2. The device of claim 1, wherein the evaluating the one or more regression models comprises:
creating an optimization model from the one or more regression models; and
evaluating the optimization model to determine assignments of each of the plurality of RAN nodes to different ones of the plurality of security gateways.

3. The device of claim 1, wherein:
the measuring the at least one performance indicator value includes measuring the at least one performance indicator value for both encrypted traffic and nonencrypted traffic at the plurality of RAN nodes;
the encrypted traffic at the plurality of RAN nodes is routed through the plurality of security gateways; and
the nonencrypted traffic at the plurality of RAN nodes is not routed through the plurality of security gateways.

4. The device of claim 1, wherein:
the measuring the at least one performance indicator value includes measuring the at least one performance indicator value over a plurality of time periods to determine a time series of performance indicator values;
the measuring the utilization metric value of the plurality of security gateways includes measuring the utilization metric value of the plurality of security gateways over the plurality of time periods to determine a time series of utilization metric values; and
the regression analysis is based on the time series of performance indicator values and the time series of the utilization metric values.

5. The device of claim 1, wherein the plurality of security gateways are implemented on virtual machines (VMs) running on a physical server; and the measuring the utilization metric value of the plurality of security gateways includes measuring values related to the physical server.

6. The device of claim 1, wherein the measuring the at least one performance indicator value includes measuring total data throughput at the plurality of RAN nodes.

7. The device of claim 1, wherein the measuring the at least one performance indicator value includes measuring a handover ratio at the plurality of RAN nodes.

8. The device of claim 1, wherein the measuring the utilization metric value includes measuring processor utilization at the plurality of security gateways.

9. The device of claim 1, wherein the measuring the utilization metric value includes measuring memory utilization at the plurality of security gateways.

10. The device of claim 1, wherein the measuring the utilization metric value includes measuring network interface card (NIC) volume at the plurality of security gateways.

11. A non-transitory machine-readable medium, comprising executable instructions that, when executed by a processing system including a processor, facilitate performance of operations, the operations comprising:
measuring, over a plurality of time periods, at least one performance indicator value of a plurality of radio access network (RAN) nodes assigned to communicate with at least one security gateway to determine a time series of performance indicator values;
measuring, over the plurality of time periods, a utilization metric value of the at least one security gateway to determine a time series of utilization metric values;
performing a regression analysis based on the time series of performance indicator values and the time series of utilization metric values to determine one or more regression models;
creating an optimization model using the one or more regression models, wherein at least one output of the one or more regression models becomes a feature in the optimization model; and
evaluating the optimization model to create new assignments of the plurality of RAN nodes to communicate with the at least one security gateway.

12. The non-transitory machine-readable medium of claim 11, wherein the optimization model is configured to create new assignments that satisfy constraints related to the time series of utilization metric values.

13. The non-transitory machine-readable medium of claim 12, wherein the constraints related to the time series of utilization metric values comprise at least one processor utilization metric.

14. The non-transitory machine-readable medium of claim 12, wherein the constraints related to the time series of utilization metric values comprise at least one network interface card utilization metric.

15. The non-transitory machine-readable medium of claim 12, wherein the at least one security gateway is implemented on a physical server, and the constraints related to the time series of utilization metric values comprise at least one metric related to the physical server.

16. The non-transitory machine-readable medium of claim 11, wherein the measuring the at least one performance indicator value includes measuring the at least one performance indicator value for both encrypted traffic and nonencrypted traffic at the plurality of RAN nodes.

17. The non-transitory machine-readable medium of claim 16, wherein the time series of utilization metric values is related to the encrypted traffic at the at least one security gateway.

18. A method, comprising:
measuring, by a processing system including a processor, a plurality of performance indicator values of a radio access network (RAN) node assigned to communicate with a security gateway;
measuring, by the processing system, a plurality of utilization metric values of the security gateway;
performing, by the processing system, regression analyses based on the plurality of performance indicator values and the plurality of utilization metric values to determine a plurality of regression models;
creating, by the processing system, an optimization model using the plurality of regression models; and
evaluating, by the processing system, the optimization model to determine if the RAN node should remain assigned to communicate with the security gateway.

19. The method of claim 18, wherein:
the measuring the plurality of performance indicator values comprises measuring the plurality of performance indicator values over a plurality of time periods; and
the measuring the plurality of utilization metric values comprises measuring the plurality of utilization metric values over the plurality of time periods.

20. The method of claim 18, wherein:
the optimization model is configured to determine RAN node to security gateway assignments that satisfy a plurality of constraints related to the plurality of utilization metric values.

* * * * *